(12) United States Patent
Kwon et al.

(10) Patent No.: US 10,050,567 B2
(45) Date of Patent: Aug. 14, 2018

(54) FLEXIBLE ENERGY CONVERSION DEVICE USING LIQUID

(71) Applicants: Korea Electronics Technology Institute, Seongnam-si, Gyeonggi-do (KR); SEOUL NATIONAL UNIVERSITY R&DB FOUNDATION, Seoul (KR)

(72) Inventors: Soon Hyung Kwon, Seoul (KR); Won Keun Kim, Seongnam-si (KR); Chul Jong Han, Seoul (KR); Jeong No Lee, Yongin-si (KR); Youn Sang Kim, Suwon-si (KR); Jun Woo Park, Yongin-si (KR)

(73) Assignees: Korea Electronics Technology Institute, Seongnam-si (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 356 days.

(21) Appl. No.: 14/647,851

(22) PCT Filed: Nov. 27, 2013

(86) PCT No.: PCT/KR2013/010817
§ 371 (c)(1),
(2) Date: May 28, 2015

(87) PCT Pub. No.: WO2014/084580
PCT Pub. Date: Jun. 5, 2014

(65) Prior Publication Data
US 2015/0340970 A1    Nov. 26, 2015

(30) Foreign Application Priority Data
Nov. 29, 2012    (KR) .................. 10-2012-0136893

(51) Int. Cl.
*H02N 1/08*     (2006.01)
*H02N 11/00*    (2006.01)
*F03G 7/00*     (2006.01)

(52) U.S. Cl.
CPC ........... *H02N 11/002* (2013.01); *F03G 7/005* (2013.01); *H02N 1/08* (2013.01)

(58) Field of Classification Search
CPC ........... F03G 7/005; H02N 1/08; H02N 1/002
(Continued)

(56) References Cited

U.S. PATENT DOCUMENTS 7,898,096 B1    3/2011   Krupenkin
8,760,032 B2 *  6/2014   Despesse .............. H02N 1/08
                                                    310/309
(Continued)

FOREIGN PATENT DOCUMENTS

JP    7-75356 A    3/1995
JP    9-257822 A   10/1997
(Continued)

OTHER PUBLICATIONS

International Searching Authority International Search Report for PCT/KR2013/010817 dated Feb. 24, 2014.

*Primary Examiner* — Forrest M Phillips
(74) *Attorney, Agent, or Firm* — Sughrue Mion, PLLC

(57) ABSTRACT

The present invention relates to a flexible energy conversion device using a liquid, and more specifically, to a method and a device for converting mechanical energy into electric energy by applying an opposite phenomenon of electrowetting, which can change a surface contacting the liquid between one pair of electrodes, and use the change of the surface contacting the liquid to generate electric energy, so as to prevent channel blocking or so that a lubricating layer or electrodes patterned onto a channel in a complicated (Continued)

manner are not required, thereby enabling simplification of the device, reduction of manufacturing cost, and the energy conversion device that is less faulty.

16 Claims, 4 Drawing Sheets

(58) Field of Classification Search
USPC .......................................................... 310/300
See application file for complete search history.

(56) References Cited

U.S. PATENT DOCUMENTS

| | | | |
|---|---|---|---|
| 2010/0295415 A1* | 11/2010 | Despesse | H02N 1/08 310/300 |
| 2013/0038299 A1* | 2/2013 | Sohn | H01L 41/45 320/166 |
| 2013/0307370 A1* | 11/2013 | Jenninger | H01L 41/113 310/300 |
| 2017/0077841 A1* | 3/2017 | Yun | H02N 11/002 |

FOREIGN PATENT DOCUMENTS

| | | | | |
|---|---|---|---|---|
| JP | 2008-507250 A | 3/2008 | | |
| JP | 2011-507479 A | 3/2011 | | |
| KR | 10-1146564 B1 | 5/2012 | | |
| WO | WO 2006121818 A2 * | 11/2006 | | H01L 41/0478 |
| WO | WO 2014111327 A1 * | 7/2014 | | H01L 41/27 |
| WO | WO 2014152889 A1 * | 9/2014 | | F03G 7/08 |

* cited by examiner

FLEXIBLE ENERGY CONVERSION DEVICE USING LIQUID

CROSS REFERENCE TO RELATED APPLICATIONS

This application is a National Stage of International Application No. PCT/KR2013/010817 filed Nov. 27, 2013, claiming priority based on Korean Patent Application No. 10-2012-0136893 filed Nov. 29, 2012, the contents of all of which are incorporated herein by reference in their entirety.

TECHNICAL FIELD

The present invention relates to a flexible energy conversion device using a liquid, and more specifically, to a method and a device for converting mechanical energy into electric energy by applying an opposite phenomenon of electrowetting.

BACKGROUND ART

The energy conversion technologies for converting mechanical energy into electrical energy of prior art use a principle that electrical capacitance is being created in the electrode under a dielectric material by varying the contact surface of a liquid metal which is in contact with a dielectric material in accordance with the flow of time.

A method and a device for converting energy using a fluid of prior art is being disclosed in the U.S. Pat. No. 7,898,096.

FIG. 1 is a block diagram of a device of prior art for converting energy using a fluid. According to FIG. 1, in a device of prior art for converting energy using a fluid, an electrode is formed to have a consistent pattern on the wall of a thin and long channel, and a dielectric material layer is formed above the electrode. Then, a little waterdrop-like conductive liquid and a non-conductive liquid are being injected into the channel, and by applying a voltage from an external power source to such a waterdrop-like conductive liquid, the conductive liquid is being depolarized.

At this state, when a physical pressure is applied to a predetermined portion (not shown) which is connected to the channel the depolarized waterdrop-like conductive liquid is moved along the channel, and during this process, the contact surface of the multiple electrodes, which is formed with a consistent pattern, with the moving multiple conductive liquid drop is continuously changing with time, and as a result, an electrical energy is generated due to the electrical capacitance change.

However, a method and a device of prior art for converting energy using a fluid have various problems for commercialization.

First, since a reversible movement, wherein a drop-like liquid metal, which has been moved inside the narrow and thin channel, is returning back to its original position when the external force is removed, is difficult, there is a limitation in that a separate lubricating layer is required and an inoperable condition happens due to the easy occurrence of the channel blocking phenomenon.

Moreover, since a method and a device of prior art for converting energy using a fluid adopt a narrow and thin channel structure, the two facing electrodes must be patterned with a fixed shape on the channel wall, and the device configuration becomes complicated due to such a structure, and the size of the module producing electrical energy becomes large, and there are many limitation in mass production or cost reduction.

In addition, as for other problems, it is harmful to the human body and the environment by using a liquid metal such as mercury or galinstan, and there is a limitation in that application of an external separate power source is required for depolarizing such a conductive liquid.

Further, a method and a device of prior art for converting energy using a fluid has problems in that the reversible movements in the channel structure must be continuously implemented, and the control is difficult since the two different kinds of immiscible liquids must be used.

SUMMARY OF INVENTION

Technical Problem

An objective of the present invention is to provide a method and a device for converting energy using a liquid for generating electrical energy by changing the contact surface between the liquid and the electrodes.

Another objective of the present invention is to provide a method and a device for converting energy having a simple structure, high conversion efficiency, and low failure rates by using an energy conversion layer.

Solution to Problem

To achieve above described objectives, a flexible energy conversion device using liquid is provided, which includes: a first electrode and a second electrode which are formed spaced apart on a flexible substrate; and an energy conversion layer which is formed on at least one of the first electrode and the second electrode generating electrical energy according to a change in any one of a contact angle, a contact surface, a contact area between the electrode and the liquid, wherein both ends of the flexible substrate are connected together such that an ionic liquid or water is located between the electrodes.

Preferably, it is being characterized in that said energy conversion layer includes at least any one of an inorganic material layer, an organic material layer and a layer comprising a mixture of organic and inorganic materials.

Preferably, it is being characterized in that a hydrophobic material layer is stacked on said energy conversion layer so that the shape of said ionic liquid or water can be restored to the original shape.

Preferably, it is being characterized in that said ionic liquid includes at least any one of NaCl, LiCl, NaNO$_3$, Na$_2$SiO$_3$, AlCl$_3$—NaCl, LiCl—KCl, H$_2$O, KCL, Na, NaOH H$_2$SO$_4$, CH$_3$COOH, HF, CuSO$_4$, ethylene glycol, propylene glycol and AgCl.

In addition, a flexible energy conversion device using liquid is provided, which is characterized in that and includes: a first electrode and a second electrode which are formed spaced apart on a flexible substrate; and an energy conversion layer which is formed on at least one of said first electrode or said second electrode generating electrical energy according to the change in any one of the contact angle, the contact surface, and the contact area between the electrode and the liquid, wherein the both ends of said flexible substrate are connected together such that a conductive liquid is located between the electrodes.

Preferably, it is being characterized in that said energy conversion layer includes at least any one of an inorganic material layer, an organic material layer and a layer comprising a mixture of organic and inorganic materials.

Preferably, it is being characterized in that a hydrophile material layer is stacked on said energy conversion layer so that the shape of said conductive liquid can be restored to the original shape.

Preferably, it is being characterized in that said hydrophile material layer includes: poly acrylic acid (PAA), acrylamides, maleic anhydride copolymers, methacrylate, ethacrylate, amine-functional polymers, amine-functional polymers, polystyrenesulfonate(PSS), vinyl acids, vinyl alcohols, or a material including at least any one functional group of —NH, —CO—, amino group —NH$_2$, hydroxyl group —OH and carboxyl group —COOH.

Preferably, it is being characterized in that the range of the specific resistivity of said conductive liquid is 1 μΩ/cm to 1000 μΩ/cm, and the dielectric constant K thereof is not higher than 5.

Preferably, it is being characterized in that said energy conversion layer includes an organic material layer including at least any one material of polymethylmethacrylate (PMMA), polyethylene(PE), polystyrene(PS), polyvinylpyrolidone(PVP), poly(4-vinylpenol)(PVP) or polyethersulfone(PES), poly(4-methoxyphenylacrylate; PMPA), poly(phenylacrylate)(PPA), poly(2,2,2-trifluoroethyl methacrylate)(PTFMA), cyanoethylpullulan(CYEPL), polyvinyl chloride(PVC), poly(parabanic acid resin)(PPA), poly(t-butylstyrene)(PTBS), polythienylenevinylene(PTV), polyvinylacetate(PVA), poly(vinyl alcohol)(PVA), poly(rm-ethylstyrene)(PAMS), poly(vinyl alcohol)-co-poly(vinyl acetate)-co-poly(itaconic acid)(PVAIA), polyolefin, polyacrylate, parylene-C, polyimide, octadecyltrichlorosilane (OTS), poly(triarylamine)(PTTA), poly-3-hexylthiophene (P3HT), cross-linked poly-4-vinylphenol(cross-linked PVP), poly(perfluoroalkenylvinyl ether), nylon-6, n-octadecylphosphonic acid(ODPA), polytetrafluoroethylene (PTFE), silicone, polyurethane, latex, cellulose acetate, poly (hydroxy ethyl methacrylate) (PHEMA), polylactide(PLA), polyglycolide(PGA), or polyglycolide-co-lactide(PGLA).

Preferably, it is being characterized in that said energy conversion layer includes an inorganic material layer including at least any one material of $SiO_2$, $TiO_2$, $Al_2O_3$, $Ta_2O_5$, tantalum pentoxide, zinc oxide(ZnO), tantalum pentoxide ($Ta_2O_5$), yttrium oxide($Y_2O_3$), cerium oxide($CeO_2$), titanium dioxide($TiO_2$), barium titanate($BaTiO_3$), barium zirconate titanate(BZT), zirconium dioxide($ZrO_2$), lanthanum oxide($La_2O_3$), hafnon($HfSiO_4$), lanthanum aluminate ($LaAlO_3$), silicon nitride($Si_3N_4$), perovskite materials, strontium titanate(SrTiO3), barium strontium titanate(BST), lead zirconate titanate(PZT), calcium copper titanate(CCTO), $HfO_2$, apatite ($A_{10}$ $(MO_4)_6X_2$), hydroxyapatite ($Ca_{10}$ $(PO_4)_6(OH)_2$), tricalcium phosphate ($Ca_3$ $(PO_4)_2$), $Na_2O$—CaO—$SiO_2$, or bioglass(CaO—$SiO_2$—$P_2O_5$).

Preferably, it is being characterized in that a non-conductive gas, which is disposed between the electrodes and comprising at least any one of air, oxygen, nitrogen, argon, helium, neon, krypton, xenon, and radon, is further included.

Preferably, it is being characterized in that said energy conversion layer has a structure formed therein for enlarging the contact surface contacting said conductive liquid.

Preferably, it is being characterized in that said first electrode or said second electrode is an inorganic electrode including at least any one of ITO, IGO, chrome, aluminum, indium zinc oxide(IZO), indium gallium zinc oxide(IGZO), ZnO, $ZnO_2$ and $TiO_2$; or a metal electrode including at least any one of platinum, gold, silver, aluminum, iron and copper; or an organic electrode including at least any one of polyethylenedioxythiophene(PEDOT), carbon nano tube (CNT), graphene, polyacetylene, polythiophene(PT), polypyrrole, polyparaphenylene(PPV), polyanilinep), poly sulfur nitride, stainless steel, iron alloy containing more than 10% of crome, SUS 304, SUS 316, SUS 316L, Co—Cr alloy, Ti alloy, nitinol(Ni—Ti) and polyparaphenylenevinylene.

The details of the other exemplary embodiments are included in the detailed description of embodiments and the drawings.

Advantageous Effects of Invention

The present invention changes the contact surface of liquid between a pair of electrodes, and utilizes the resulting change in the contact surface of the liquid for electrical energy generation. Thus, it has an effect of implementing an energy conversion device having less failures with a simplified device structure and a reduced manufacturing cost by preventing the channel blocking phenomenon, and by not requiring any lubrication layer, or any complicatedly patterned electrodes in the channel.

In addition, the present invention is advantageous in that efficient electrical energy conversion is possible without separately applying external power.

And, the present invention has an effect on solving the harmful problem to the human body and the environment by using an ionic liquid or water.

DETAILED DESCRIPTION OF EMBODIMENT

The advantages and the features of the present invention, and the method for achieving thereof will become apparent with reference to the exemplary embodiments described in detail hereinafter with the accompanying drawings. However, the present invention will not be limited to the exemplary embodiments described hereinafter, but will be implemented in a various different forms, and the exemplary embodiments are provided for the completeness of the disclosure of the present invention and to teach an ordinary person of skill in the art of the scope of the invention completely, and the present invention is only be defined by the scope of the claims. Meanwhile, the terms used in the description are for describing the exemplary embodiments, but not to limit the present invention.

Figure 1:
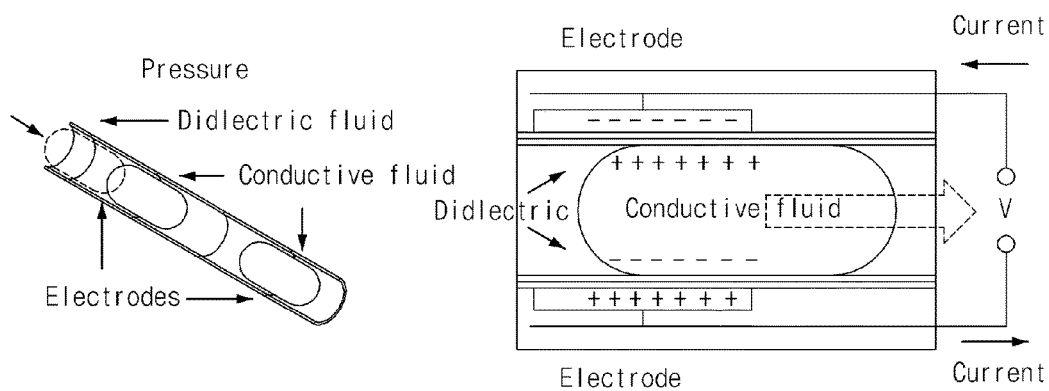
FIG. 1 is a block diagram of an energy conversion device using a fluid of prior art.
Figure 2:
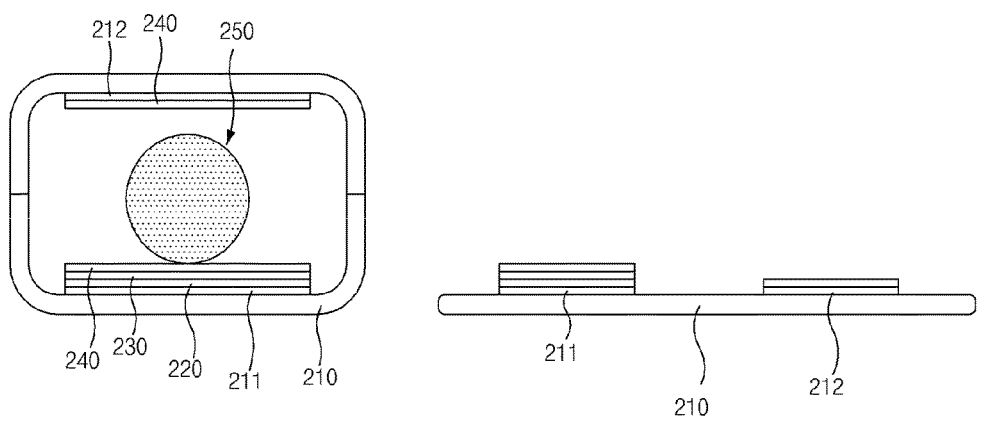
FIG. 2 is a schematic diagram of a flexible energy conversion device using a liquid according to an exemplary embodiment of the present invention.

FIG. 2 is a schematic diagram of a flexible energy conversion device using a liquid according to an exemplary embodiment of the present invention. Referring to FIG. 2, a flexible energy conversion device using liquid according to an exemplary embodiment of the present invention includes: a flexible substrate 210; a first electrode 211 and a second electrode 212 which are formed spaced apart on a flexible substrate 210; and energy conversion layers 220 and 230 which are formed on at least one of the first electrode 211 or the second electrode 212 generating electrical energy according to the change in any one of the contact angle, the contact surface, and the contact area between the electrode and the liquid.

In addition, the both ends of the flexible substrate 210 are connected forming a tunnel-like shape as shown in the left drawing of FIG. 2.

An ionic liquid or water 250 is located in a space formed between the first electrode 211 and the second electrode 212 as the both ends of the flexible substrate are being connected. Preferably, the flexible substrate 210 is capable of transforming into various shapes by the external physical forces, and comprising a material which can restore its original shape when the external physical force is removed.

Figure 3A:
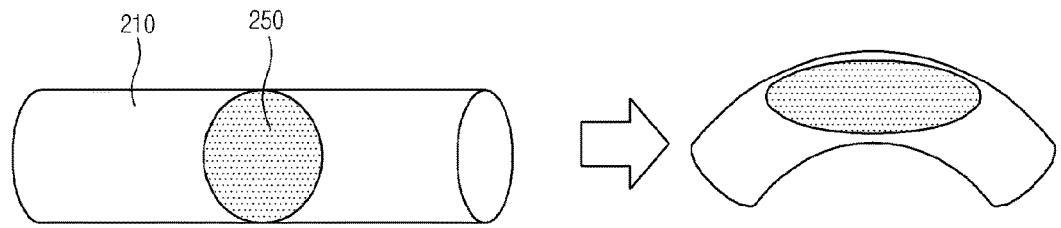
FIGS. 3a-3d are drawings showing the modalities of usage for energy conversion by an energy conversion device using a liquid according to an exemplary embodiment of the present invention.
Figure 3B:
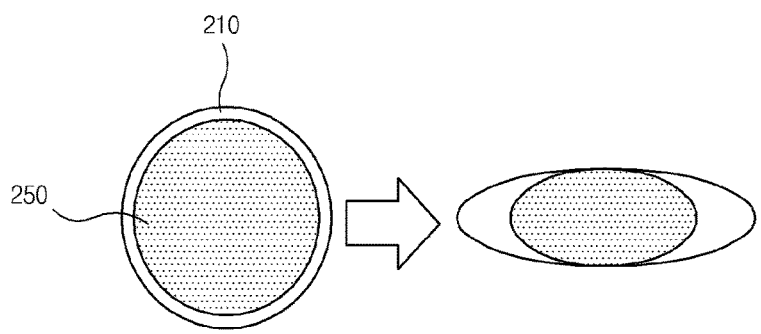
Figure 3C:
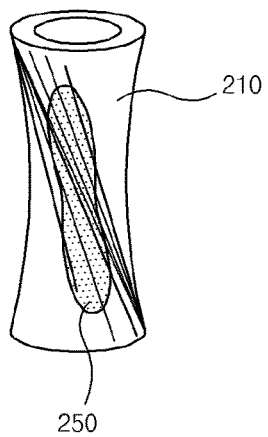
Figure 3D:
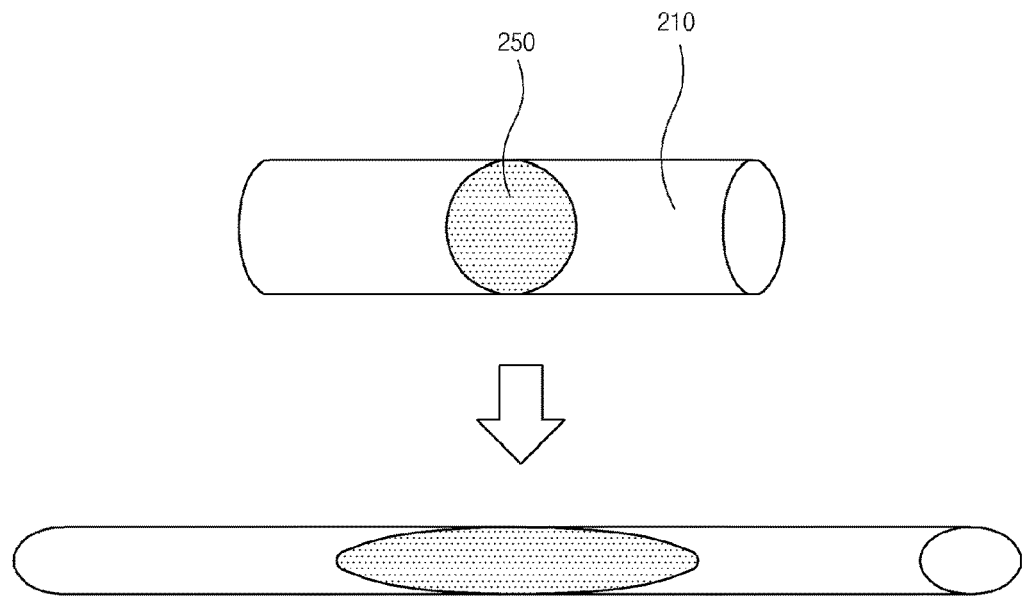
Figure 4A:
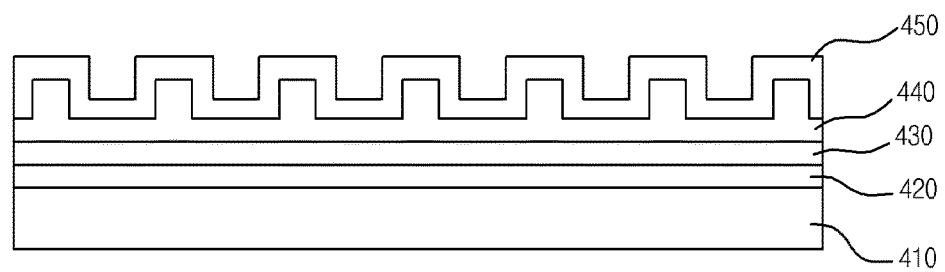
FIGS. 4a-4d are side views showing the exemplary embodiments of an energy conversion layer of a flexible energy conversion device using a liquid according to an exemplary embodiment of the present invention.
Figure 4B:
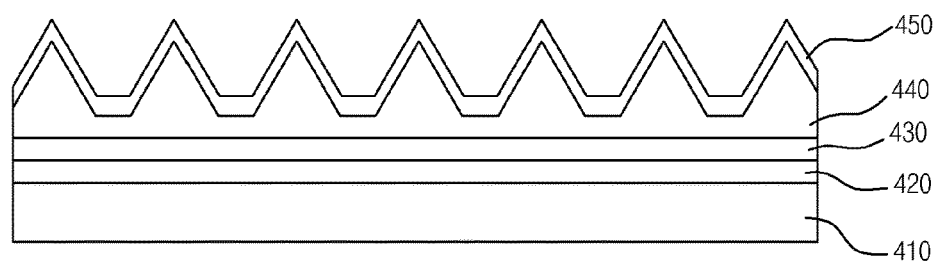
Figure 4C:
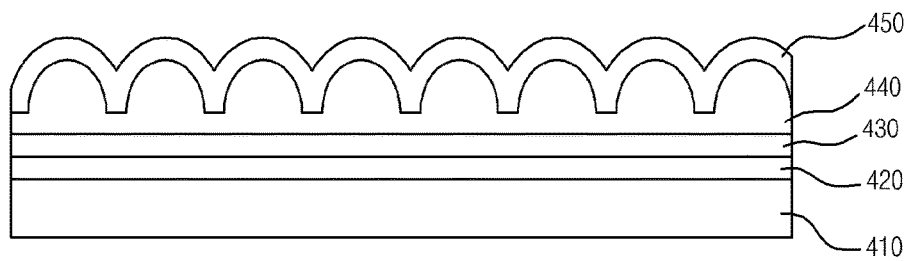
Figure 4D:
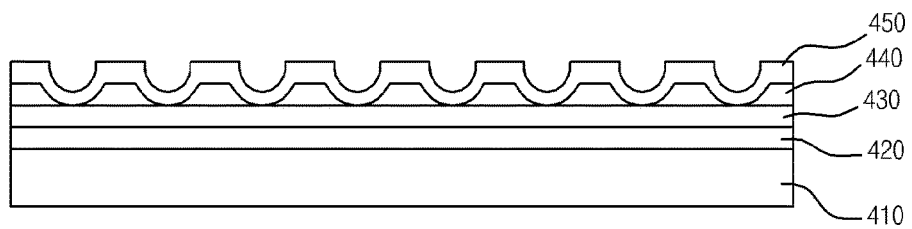

FIGS. 3a-3d are drawings showing the modalities of usage for energy conversion by an energy conversion device using a liquid according to an exemplary embodiment of the present invention. Referring to FIGS. 3a-3d, the shape of the flexible substrate 210 is changed by an external physical force corresponding to bending (FIG. 3a), pressing (FIG. 3b), twisting (FIG. 3c), or stretching (FIG. 3d). In consequence of such change, a change is occurring in at least any one of the contact angle, the contact surface, and the contact area between the first electrode 211 and the second electrode 212 and the ionic liquid or water 250. As a result, an electrical energy is generated by the energy conversion layer, therefore a repeated electrical energy generation becomes possible owing to the property of the flexible substrate 210.

That is, a flexible energy conversion device using a liquid according to an exemplary embodiment of the present invention generates an electrical energy by producing a change in the electrical capacitance according to the change in at least any one of the contact angle, the contact surface, and the contact area between the first electrode 211 and the second electrode 212 and the ionic liquid or water 250.

Again referring to FIG. 2, according to an exemplary embodiment of the present invention, an energy conversion layer is comprised by stacking an inorganic material layer 220 and/or an organic material layer 230. Preferably, methods such as patterning, vacuum deposition, or spin coating may be used in forming such energy conversion layer.

In stacking the inorganic material layer 220 and the organic material layer 230 on the first electrode 211 or on the second electrode 212, the order of stacking will not matter, however, they must be stacked adjacently.

Also, preferably, the energy conversion layer may be formed to be an integral layer covering both the first electrode 211 and the second electrode 212.

Preferably, the inorganic material layer 220 and the organic material layer 230 may be alternately and repeatedly filed up when being stacked on the first electrode 211 or on the second electrode 212. In other words, an energy conversion layer can be formed by repeatedly stacking the inorganic material layer 220 and the organic material layer 230.

According to a preferred exemplary embodiment of the present invention, an inorganic material layer 220 or an organic material layer 230 is deposited such that a structure for enlarging the contact surface with the ionic liquid or water 250 is formed therein.

FIGS. 4a-4d are side views showing the exemplary embodiments of an energy conversion layer of a flexible energy conversion device using a liquid according to an exemplary embodiment of the present invention. Referring to FIGS. 4a-4d, an inorganic material layer 430 is deposited on the electrode 420 which is included in the electrode 420 as an energy conversion layer of a flexible energy conversion device using a liquid according to an exemplary embodiment of the present invention. The organic material layer 440 is stacked on the inorganic material layer 430 to form a micro structure having shapes such as a convex-concave shape shown in FIG. 4a, a sharply protruded shape shown in FIG. 4b, a semi sphere shape shown in FIG. 4c, and a spherical pit shape shown FIG. 4d. Preferably, the stacking order between the organic material layer 440 and the inorganic material layer 430 may be reversed, and the stacking material for forming the structure is not necessarily to be an organic material layer 440.

Preferably, a hydrophobic material layer 450 is stacked on the organic material layer 440 which is being stacked for forming the structure so that the shape of the structure is being maintained.

Such shapes of the structure have effects on increasing the generation efficiency of electrical energy by enlarging the change in the contact area between the electrode 420 and the ionic liquid or water.

Again referring to FIG. 2, a plurality of energy conversion devices using change of contact surface with liquid are connected in an array form according to a preferred exemplary embodiment of the present invention. As previously described, this is to increase the generation efficiency of electrical energy by enlarging the change in the contact area between the electrodes and the ionic liquid or water.

According to a preferred exemplary embodiment of the present invention, a hydrophobic material layer 240 is stacked on the energy conversion layers 220 and 230. The shape of the ionic liquid or water 250 is changed according to the change in the contact surface, the contact area, or the contact angle thereof with the electrodes 211 and 212. Therefore a hydrophobic material layer 240 is stacked so that such shape change is being restored to its original shape.

Preferably, the hydrophobic material layer 250 may be stacked on the first electrode 211 or on the second electrode 212 wherein no energy conversion layer is formed.

According to a preferred exemplary embodiment of the present invention, an energy conversion layer includes: an organic material layer 230 including at least any one material of polymethylmethacrylate(PMMA), polyethylene(PE), polystyrene(PS), polyvinylpyrrolidone(PVP), poly(4-vinylpenol)(PVP) or polyethersulfone(PES), poly(4-methoxyphenylacrylate; PMPA), poly(phenylacrylate)(PPA), poly(2,2,2-trifluoroethyl methacrylate)(PTFMA), cyanoethylpullulan(CYEPL), polyvinyl chloride(PVC), poly(parabanic acid resin)(PPA), poly(t-butylstyrene) (PTBS), polythienylenevinylene(PTV), polyvinylacetate (PVA), poly(vinyl alcohol)(PVA), poly(rmethylstyrene) (PAMS), poly(vinyl alcohol)-co-poly(vinyl acetate)-co-poly (itaconic acid)(PVAIA), polyolefin, polyacrylate, parylene-C, polyimide, octadecyltrichlorosilane(OTS), poly (triarylamine)(PTTA), poly-3-hexylthiophene(P3HT), cross-linked poly-4-vinylphenol(cross-linked PVP), poly (perfluoroalkenylvinyl ether), nylon-6, n-octadecylphosphonic acid(ODPA), polytetrafluoroethylene(PTFE), silicone, polyurethane, latex, cellulose acetate, poly(hydroxy ethyl methacrylate) (PHEMA), polylactide(PLA), polyglycolide (PGA), or polyglycolide-co-lactide(PGLA); and an inorganic material layer 220 including at least any one material of $SiO_2$, $TiO_2$, $Al_2O_3$, $Ta_2O_5$, tantalum pentoxide, zinc oxide(ZnO), tantalum pentoxide($Ta_2O_5$), yttrium oxide ($Y_2O_3$), cerium oxide($CeO_2$), titanium dioxide($TiO_2$), barium titanate(BaTiO$_3$), barium zirconate titanate(BZT), zirconium dioxide(ZrO$_2$), lanthanum oxide(La$_2$O$_3$), hafnon (HfSiO$_4$), lanthanum aluminate(LaAlO$_3$), silicon nitride (Si$_3$N$_4$), as perovskite materials, strontium titanate(SrTiO3), barium strontium titanate(BST), lead zirconate titanate (PZT), calcium copper titanate(CCTO), or HfO$_2$, apatite (A$_{10}$(MO$_4$)$_6$X$_2$), hydroxyapatite(Ca$_{10}$(PO$_4$)$_6$(OH)$_2$), tricalcium phosphate(Ca$_3$(PO$_4$)$_2$), Na$_2$O—CaO—SiO$_2$, or bioglass(CaO—SiO$_2$—P$_2$O$_5$).

Preferably, a material having dielectric constant (K) lower than 4 may be used for the organic material 230, and a material having dielectric constant (K) higher than 5 may be used for the inorganic material 220.

According to a preferred exemplary embodiment of the present invention, hydrophobic material layer 240 includes at least any one or a mixture of silane family material, fluoropolymer material, trichlorosilane, trimethoxysilane, pentafluorophenylpropyltrichlorosilane, (benzyloxy)alkyltrimethoxysilane(BSM-22), (benzyloxy)alkyltrichlorosilane (BTS), hexamethyldisilazane(HMDS), octadecyltrichlorosilane(OTS), octadecyltrimethoxysilane(OTMS), and divinyltetramethyl disiloxane-bis(benzocyclobutene)(BCB).

According to a preferred exemplary embodiment of the present invention, the first electrode 211 or the second electrode 212 is an inorganic electrode which includes at least any one of ITO, IGO, chrome, aluminum, indium zinc oxide(IZO), indium gallium zinc oxide(IGZO), ZnO, ZnO$_2$ or TiO$_2$; or a metal electrode including at least any one of aluminum, iron or copper; or an organic electrode including at least any one of polyethylenedioxythiophene(PEDOT), carbon nano tube(CNT), graphene, polyacetylene, polythiophene(PT), polypyrrole, polyparaphenylene(PPV), polyanilinep), poly sulfur nitride, stainless steel, iron alloy containing more than 10% of chrome, SUS 304, SUS 316, SUS 316L, Co—Cr alloy, Ti alloy, nitinol(Ni—Ti), or polyparaphenylenevinylene.

According to a preferred exemplary embodiment of the present invention, the ionic liquid 260 includes at least any one of NaCl, LiCl, NaNO$_3$, Na$_2$SiO$_3$, AlCl$_3$—NaCl, LiCl—KCl, H$_2$O, KCL, Na, NaOH H$_2$SO$_4$, CH$_3$COOH, HF, CuSO$_4$, ethylene glycol, propylene glycol or AgCl.

According to a preferred exemplary embodiment of the present invention, it is configured to fill the space between the electrodes, which is formed by connecting the both ends of the flexible substrate 210, with a non-conductive gas. Generally, the space between the electrodes could be a normal aerial environment.

According to a preferred exemplary embodiment of the present invention, the non-conductive gas includes at least any one of air, oxygen, nitrogen, argon, helium, neon, krypton, xenon, or radon.

Figure 5:
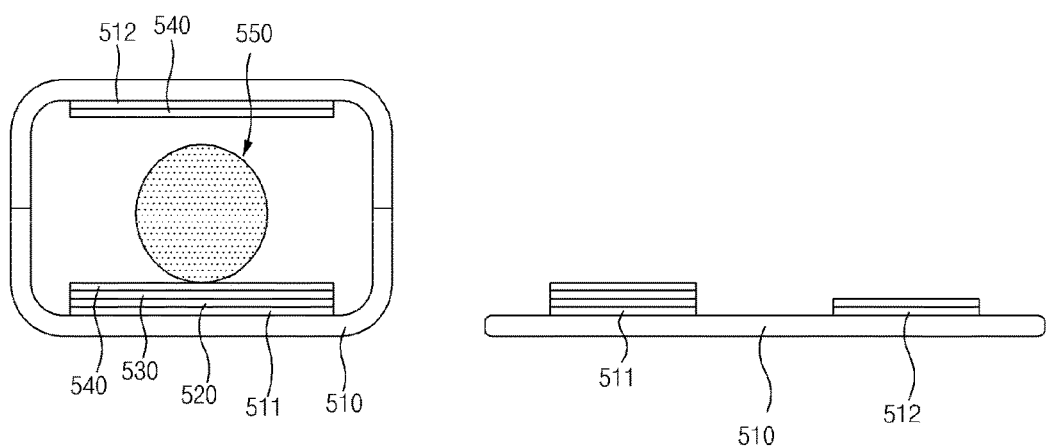
FIG. 5 is a structural drawing of a flexible energy conversion device using a liquid according to another exemplary embodiment of the present invention.

FIG. 5 is a structural drawing of a flexible energy conversion device using a liquid according to another exemplary embodiment of the present invention. Referring to FIG. 5, a flexible energy conversion device using a liquid according to an exemplary embodiment of the present invention includes: a flexible substrate 510; a first electrode 511 and a second electrode 512 which are formed spaced apart on the flexible substrate 510; and energy conversion layers 520 and 530 which are formed on at least one of the first electrode 511 or the second electrode 512 generating electrical energy according to the change in any one of the contact angle, the contact surface, and the contact area between the electrode and the liquid.

In addition, the both ends of the flexible substrate 510 are connected forming a tunnel-like shape as shown in the left drawing of FIG. 2.

A conductive liquid 550 is located in a space formed between the first electrode 211 and the second electrode 212 as the both ends of the flexible substrate are being connected. According to a preferred exemplary embodiment of the present invention, it is preferred that the conductive liquid 560 may use mercury, lithium, gallium, kalium, NaK, bismuth, tin, natrium, natrium-kalium alloy, and the like; the range of the specific resistivity is 1 μΩ/cm to 1000 μΩ/cm, and the dielectric constant K is not higher than 5.

According to a preferred exemplary embodiment of the present invention, a hydrophile material layer 540 is stacked on the energy conversion layers 520 and 530. The shape of the conductive liquid 550 is changed according to the change in the contact surface, the contact area, or the contact angle thereof with the electrodes 511 and 512. Therefore a hydrophile material layer 540 is stacked so that such shape change is being restored to its original shape.

According to a preferred exemplary embodiment of the present invention, a hydrophile material layer 540 includes poly acrylic acid(PAA), acrylamides, maleic anhydride copolymers, methacrylate, ethacrylate, amine-functional polymers, amine-functional polymers, polystyrenesulfonate (PSS), vinyl acids, vinyl alcohols, and materials including at least any one functional group of —NH, —CO—, amino group —NH$_2$, hydroxyl group —OH or carboxyl group —COOH.

Besides, in the above described exemplary embodiment using a conductive liquid, the detailed descriptions of the technical contents related to materials of the electrodes or the substrates constituting the first electrode 511 and the second electrode 512, the features and the structure of the inorganic material layer 520 and the organic material layer 530, the usage of the energy conversion devices of the present invention in a multiple manner, and the like are omitted since it can be configured according to the foregoing exemplary embodiments using the ionic liquid or water, or the contents described in FIG. 2 or FIG. 3, and FIGS. 4a to 4d.

As reviewed before, when compared with prior art using more than two different kinds of liquids, the present invention may prevent blocking and mixing phenomena inside the channel, and also it does not require any lubricating layer.

Furthermore, although the technologies of prior art suggests an insulation layer comprising a single self assembly molecular monolayer and a single dielectric layer, or more layers of non-conductive layers, or the various combination thereof, however, the present invention suggests a structure for optimizing the energy conversion efficiency. In other words, it is configured to have a structure of electrode/inorganic material layer/organic material layer/(select one from hydrophobic material layer and hydrophile material layer according to the liquid type) or electrode/organic material layer/inorganic material layer/(select one from hydrophobic material layer and hydrophile material layer according to the liquid type) (according to the stacking order) on at least one side of the substrate of the first electrode or the second electrode; or it may be changed to be configured to have a structure of electrode/inorganic material layer/organic material layer/(select one from hydrophobic material layer and hydrophile material layer according to the liquid type) or electrode/organic material layer/inorganic material layer/(select one from hydrophobic material layer and hydrophile material layer according to the liquid type) (according to the stacking order) on both of the first electrode and the second electrode.

And, application of an external power source for depolarization is required in using a conductive liquid according to the technology of prior art, however, application of an external power source is not required in the present invention since the energy conversion layer performs depolarizing function for the ionic liquid.

In addition, while the height and the volume of the channel are fixed in a typical energy conversion device using fluid of the prior art, the present invention generates an electrical energy by generating a change in at least any one of the contact angle, the contact surface, and the contact area with the liquid contained inside the flexible substrate due to the bending, stretching, twisting, pressing, and the like of the flexible substrate.

Preferably, various shapes such as a circular shape, a rectangular shape, a triangular shape, a pentagonal shape, a hexagonal shape, and the like are possible for the shapes formed by connecting the both ends of the flexible substrate. Although the preferred exemplary embodiments and the application examples are illustrated and described, heretofore, the present invention is not limited by the above described specific exemplary embodiments and the application examples, naturally, various variant embodiments are possible by a person of ordinary skill in the art without departing the gist of the present invention claimed within the scope of the claims, and these variant embodiments should not be individually understood from the technical spirit or the expectation of the present invention.

DESCRIPTION OF SYMBOLS

210: flexible substrate
211: first electrode
212: second electrode
220: inorganic material layer
230: organic material layer
240: hydrophobic material layer
250: ionic liquid or water

The invention claimed is:

1. A flexible energy conversion device using liquid comprising:
   a first electrode and a second electrode which are formed spaced apart on a flexible substrate; and
   an energy conversion layer which is formed on at least one of the first electrode and the second electrode generating electrical energy according to a change in any one of a contact angle, a contact surface, a contact area between the electrode and the liquid,
   wherein both ends of the flexible substrate are connected together such that an ionic liquid or water is located between the electrodes.

2. The flexible energy conversion device according to claim 1, wherein the energy conversion layer includes at least any one of an inorganic material layer, an organic material layer and a layer comprising a mixture of organic and inorganic materials.

3. The flexible energy conversion device according to claim 2, wherein a hydrophobic material layer is stacked on the energy conversion layer so that a shape of the ionic liquid or water can be restored to an original shape.

4. The flexible energy conversion device according to claim 1, wherein the ionic liquid includes at least any one of NaCl, LiCl, NaNO$_3$, Na$_2$SiO$_3$, AlCl$_3$—NaCl, LiCl—KCl, KCL, Na, NaOH, H$_2$SO$_4$, CH$_3$COOH, HF, CuSO$_4$, ethylene glycol, propylene glycol and AgCl.

5. The flexible energy conversion device according to claim 1, wherein the energy conversion layer includes an organic material layer including at least any one material of: polymethylmethacrylate(PMMA), polyethylene(PE), polystyrene(PS), polyvinylpyrrolidone(PVP), poly(4-vinylpenol)(PVP) or polyethersulfone(PES), poly(4-methoxyphenylacrylate; PMPA), poly(phenylacrylate) (PPA), poly(2,2,2-trifluoroethyl methacrylate) (PTFMA), cyanoethylpullulan(CYEPL), polyvinyl chloride(PVC), poly(parabanic acid resin)(PPA), poly (t-butylstyrene)(PTBS), polythienylenevinylene(PTV), polyvinylacetate(PVA), poly(vinyl alcohol)(PVA), poly (rmethylstyrene)(PAMS), poly(vinyl alcohol)-co-poly (vinyl acetate)-co-poly(itaconic acid)(PVAIA), polyolefin, polyacrylate, parylene-C, polyimide, octadecyltrichlorosilane(OTS), poly(triarylamine) (PTTA), poly-3-hexylthiophene(P3HT), cross-linked poly-4-vinylphenol(cross-linked PVP), poly(perfluoro-alkenylvinyl ether), nylon-6, n-octadecylphosphonic acid(ODPA), polytetrafluoroethylene(PTFE), silicone, polyurethane, latex, cellulose acetate, poly(hydroxy ethyl methacrylate)(PHEMA), polylactide(PLA), polyglycolide(PGA), and polyglycolide-co-lactide (PGLA).

6. The flexible energy conversion device according to claim 1, wherein the energy conversion layer includes:
   an inorganic material layer including at least any one material of SiO$_2$, TiO$_2$, Al$_2$O$_3$, Ta$_2$O$_5$, tantalum pentoxide, zinc oxide(ZnO), tantalum pentoxide(Ta$_2$O$_5$), yttrium oxide(Y$_2$O$_3$), cerium oxide(CeO$_2$), titanium dioxide(TiO$_2$), barium titanate(BaTiO$_3$), barium zirconate titanate(BZT), zirconium dioxide(ZrO$_2$), lanthanum oxide(La$_2$O$_3$), hafnion(HfSiO$_4$), lanthanum aluminate(LaAlO$_3$), silicon nitride(Si$_3$N$_4$), perovskite materials, strontium titanate(SrTiO3), barium strontium titanate(BST), lead zirconate titanate(PZT), calcium copper titanate(CCTO), HfO$_2$, apatite(A$_{10}$(MO$_4$)$_6$X$_2$), hydroxyapatite(Ca$_{10}$(PO$_4$)$_6$(OH)$_2$), tricalcium phosphate(Ca$_3$(PO$_4$)$_2$), Na$_2$O—CaO—SiO$_2$, and bioglass(CaO—SiO$_2$—P$_2$O$_5$).

7. The flexible energy conversion device according to claim 1, further comprising a non-conductive gas, which is disposed between the electrodes and includes at least any one of oxygen, nitrogen, argon, helium, neon, krypton, xenon, and radon.

8. The flexible energy conversion device using liquid in claim 1, wherein the energy conversion layer has a structure formed therein for enlarging the contact surface contacting the conductive liquid.

9. The flexible energy conversion device according to claim 1, wherein the first electrode or the second electrode is an inorganic electrode including at least any one of ITO, IGO, chrome, aluminum, indium zinc oxide(IZO), indium gallium zinc oxide(IGZO), ZnO, ZnO$_2$ and TiO$_2$; or a metal electrode including at least any one of platinum, gold, silver, aluminum, iron and copper; or an organic electrode including at least any one of polyethylenedioxythiophene (PEDOT), carbon nano tube(CNT), graphene, polyacetylene, polythiophene(PT), polypyrrole, polyparaphenylene(PPV), polyanilinep), poly sulfur nitride, stainless steel, iron alloy containing more than 10% of crome, SUS 304, SUS 316, SUS 316L, Co—Cr alloy, Ti alloy, nitinol(Ni—Ti) and polyparaphenylenevinylene.

10. The flexible energy conversion device according to claim 1, wherein the energy conversion device is not connected to an external power source for depolarizing the ionic liquid or water.

11. The flexible energy conversion device according to claim 1, wherein at least one of the contact angle, the contact surface and the contact area changes according to a change in shape of the flexible substrate.

12. A flexible energy conversion device using liquid comprising:
   a first electrode and a second electrode which are formed spaced apart on a flexible substrate; and
   an energy conversion layer which is formed on at least one of the first electrode or the second electrode generating electrical energy according to a change in any one of a contact angle, a contact surface, and a contact area between the electrode and the liquid,
   wherein both ends of the flexible substrate are connected together such that a conductive liquid is located between the electrodes.

13. The flexible energy conversion device according to claim 12, wherein the energy conversion layer includes at least any one of an inorganic material layer, an organic material layer and a layer comprising a mixture of organic and inorganic materials.

14. The flexible energy conversion device according to claim 13, wherein a hydrophile material layer is stacked on the energy conversion layer so that a shape of the conductive liquid can be restored to an original shape.

15. The flexible energy conversion device according to claim 14, wherein the hydrophile material layer includes:
   poly acrylic acid(PAA), acrylamides, maleic anhydride copolymers, methacrylate, ethacrylate, amine-functional polymers, amine-functional polymers, polystyrenesulfonate(PSS), vinyl acids, vinyl alcohols, or a material including at least any one functional group of —NH, —CO—, amino group —NH$_2$, hydroxyl group —OH and carboxyl group —COOH.

16. The flexible energy conversion device according to claim 12, wherein a range of a specific resistivity of the conductive liquid is 1 μΩ/cm to 1000 μΩ/cm, and a dielectric constant K thereof is not higher than 5.

* * * * *